Patented Mar. 11, 1941

2,234,704

UNITED STATES PATENT OFFICE 2,234,704

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application April 15, 1939, Serial No. 268,126

8 Claims. (Cl. 260—205)

This invention relates to the preparation of a new series of azo dyes.

We have discovered that a valuable series of water-soluble aryl azo dyes suitable for the coloration of organic derivatives of cellulose particularly cellulose acetate can be prepared by coupling suitable aryl diazonium salts with amines having the formula:

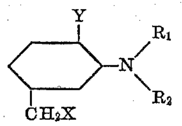

wherein $R_1$ and $R_2$ each represent a member selected from the group hydrogen, alkyl or substituted alkyl, cycloalkyl, alkylene, aryl, arylene, or heterocyclic groups, Y represents a member selected from the group $R_2$, alkoxy, and aryloxy, and X represents a sulfo group, a sulfato group, and an acid ester of phosphorus group.

The structure of these new azo dyes may be represented by the formula:

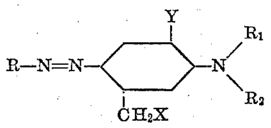

wherein R represents an aromatic nucleus, substituted as desired, and $R_1$, $R_2$, Y, and X have the meaning already given above.

It is an object, therefore, of this invention to prepare dyes of the class above described and to color cellulose organic derivatives such as cellulose acetate threads, yarns, filaments, and fabric materials therewith.

The coupling amines containing the sulfonic acid group:

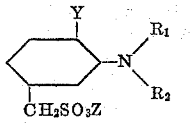

wherein $R_1$, $R_2$, and Y, each have the meaning already given, and Z represents hydrogen, an ammonium radical or an alkali forming metal are prepared in general as follows:

I. m-Nitrobenzyl alcohol (I) is converted to the corresponding halogen compound (II) by treatment with a halogenating agent such as a phosphorus halide, and this compound is then treated with a metal bisulfite such as sodium bisulfite to obtain the sulfonate salt (III), and the latter is then subjected to chemical or catalytic reduction to convert the nitro group to the amine (IV), which compound may then be alkylated and/or arylated by known methods to produce the coupling amine desired. (V).

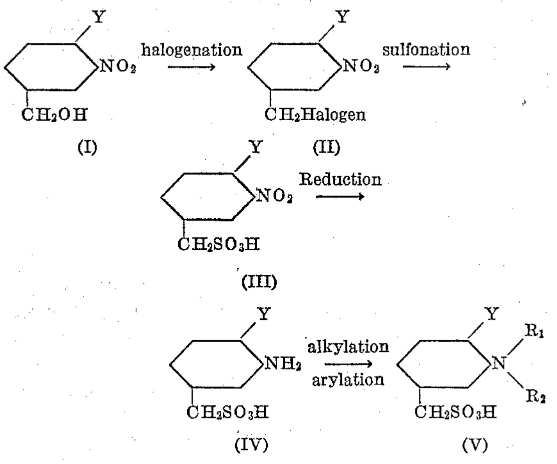

II. The procedure may be varied by starting with the sulfonate salt (I), and treating with nitric acid to obtain the m-nitrobenzyl sulfonate salt (II), followed by reduction of the nitro group to the amine (III) and then converting the latter by known standard methods of alkylation and/or arylation to the desired amine (IV).

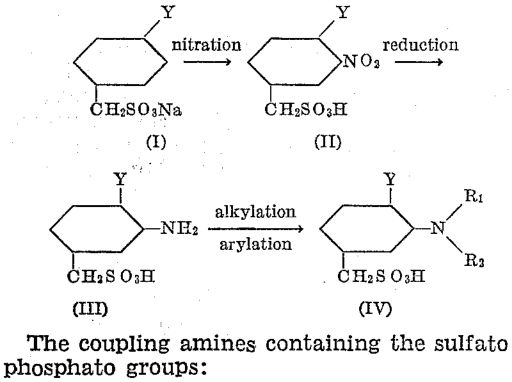

The coupling amines containing the sulfato or phosphato groups:

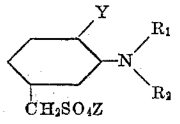

and

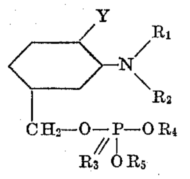

wherein $R_1$, $R_2$, Y, and Z have the meanings already given, $R_3$ represents oxygen or sulphur, and $R_4$ and $R_5$ each represent a member selected from the group consisting of hydrogen alkali forming metal, ammonium radical, and alkyl or aryl groups are prepared by sulfating or phosphating the corresponding meta amino derivatives of benzyl alcohol.

The following examples illustrate the preparation of the azo compounds of our invention.

*Example 1*

One mole of o-chloroaniline is diazotized and added to a well iced aqueous solution of one mole of m-diethylamino benzyl sodium sulfonate. After standing for a short time, the mixture is slowly made neutral to Congo paper with sodium acetate. When coupling is complete, the dye is salted out, filtered and dried. Cellulose acetate is colored yellow from an aqueous solution of the dye which may contain salt. The dye compound formed has the formula:

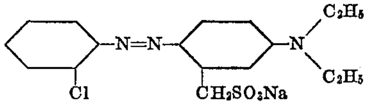

*Example 2*

One mole of methyl anthranilate is diazotized and coupled with one mole of 4-methyl-3-butylamino-benzyl ammonium sulfonate following the procedure as described in Example 1. Cellulose acetate is colored yellow from an aqueous solution of the dye which may contain salt. The dye compound has the formula:

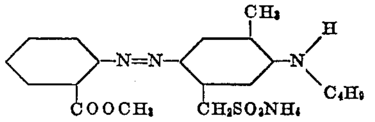

*Example 3*

One mole of 2-chloro-5-methylaniline is diazotized and coupled with one mole of the butylamine salt of 3-N-(diacetoxyethyl) amino-benzyl sulfonic acid following the procedure described in Example 1. Cellulose acetate is colored yellow from an aqueous solution of the dye which may contain salt. The dye compound has the formula:

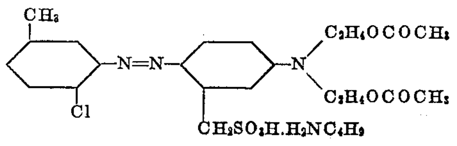

*Example 4*

One mole of p-aminoacetophenone is diazotized and coupled with one mole of 3-ethyl-$\beta$-hydroxyethylamino-benzyl sodium sulfonate following the procedure of Example 1. Cellulose acetate is colored orange from an aqueous solution of the dye which may contain salt. The dye compound has the formula:

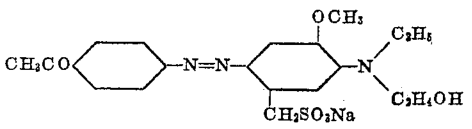

*Example 5*

12.6 grams of o-chloroaniline are diazotized in the usual manner and added to a well iced aqueous solution of 30 grams of 3-phenylaminobenzyl sodium sulfate. After standing a short time the mixture is made neutral to Congo paper with sodium acetate. When the coupling is complete, the dye is salted out, washed and dried. Cellulose acetate is colored yellow from an aqueous solution of the dye which may contain salt. The dye compound has the formula:

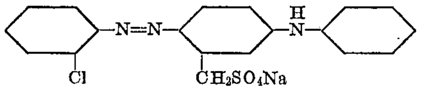

*Example 6*

One mole of 2-chloro-5-methyl-1-aminobenzene is diazotized and coupled with one mole of 3-di-methoxyethylamino-4-ethyl-benzyl ammonium sulfate following the procedure described in Example 5. Cellulose acetate is colored yellow from an aqueous solution of the dye which may contain salt. The dye compound has the formula:

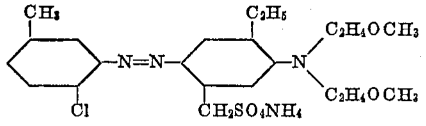

*Example 7*

13.5 grams of p-aminoacetophenone are diazotized and coupled with an equivalent amount of 3-butylamino-4-methyl-benzyl ethyl potassium phosphate following the procedure of Example 5. Cellulose acetate is colored orange from an aqueous solution of the dye which may contain salt. The dye compound has the formula:

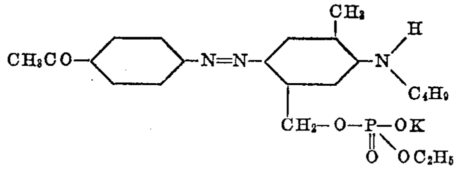

*Example 8*

One mole of methylanthranilate is diazotized and coupled with one mole of 3-ethylhydroxyethylamino-4-methoxy-benzyl phenyl ammonium thiophosphate following the procedure of Example 5. Cellulose acetate is colored yellow from an aqueous solution of the dye which may contain salt. The dye compound has the formula:

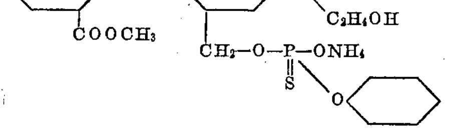

The invention is further illustrated by reference to the following table. The compound listed under the heading "Amine" is diazotized and coupled with the specified compound in the column entitled "Coupling component," the dye resulting therefrom coloring cellulose acetate the shades designated in the last column.

| Amine | Coupling component | Shade on cellulose acetate |
|---|---|---|
| 1-amino-4-nitrobenzene | 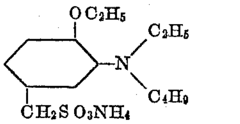 | Rubine. |
| Do | 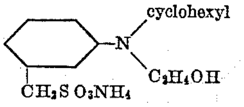 | Orange. |
| 1-amino-2-chloro-4-nitrobenzene | 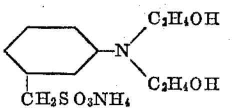 | Rubine. |
| 1-amino-2-bromo-4-nitrobenzene | 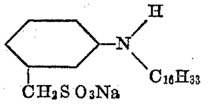 | Do. |
| Do | 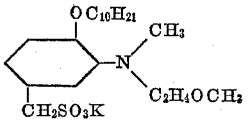 | Violet. |
| 1-amino-2-iodo-4-nitrobenzene | 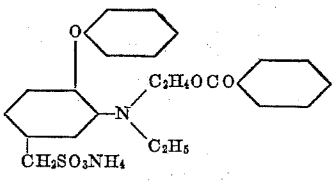 | Wine. |
| 1-amino-2-methyl-4-nitrobenzene | 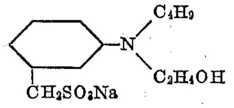 | Orange. |
| 2-amino-5-nitrophenylmethyl sulfone | 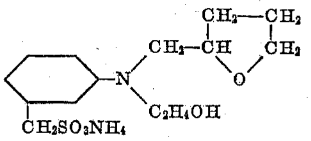 | Violet. |
| 1-amino-2,4-dinitro benzene | 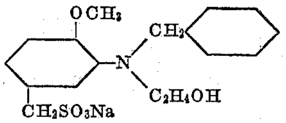 | Do. |
| 1-amino-2,4-dinitro-6-chlorobenzene | 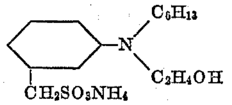 | Purple. |
| 1-amino-2,4-dinitro-6-bromobenzene | 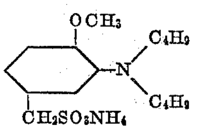 | Violet. |
| 1-amino-2,4,6-trinitro benzene | 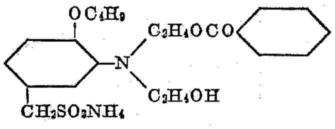 | Blue. |
| p-Amino-azobenzene | 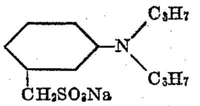 | Orange-red. |
| 1-amino-4-nitrobenzene | 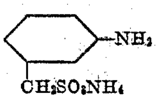 | Red. |

| Amine | Coupling component | Shade on cellulose acetate |
|---|---|---|
| 1-amino-2-chlorobenzene | 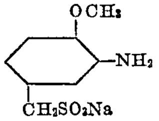 | Yellow. |
| 1-amino-2-chloro-4-nitrobenzene | 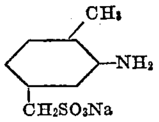 | Red. |
| 1-amino-4-acetophenone | 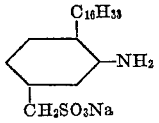 | Orange. |
| 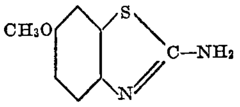 | 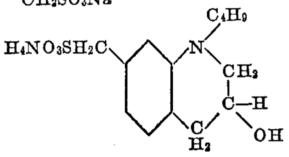 | Blue. |
| 1-amino-2-chloro-4-nitrobenzene | 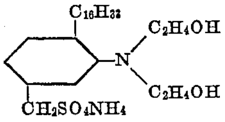 | Rubine. |
| Do | 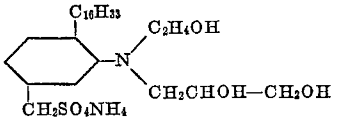 | Do. |
| 1-amino-2,4-dinitro benzene | 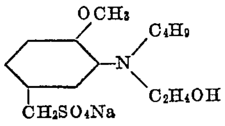 | Violet. |
| 1-amino-2,4-dinitro 6-bromobenzene | 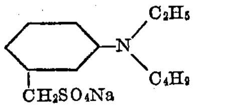 | Purple. |
| 1-amino-4-nitrobenzene | 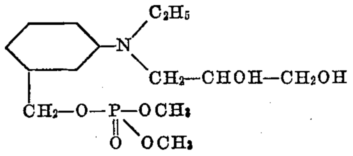 | Red. |
| 1-amino-2-methyl-4-nitrobenzene | 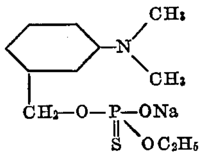 | Orange. |
| 1-amino-2-methoxy-4-nitrobenzene | 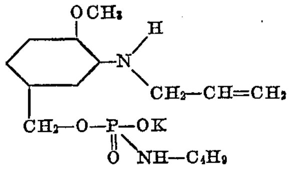 | Rubine. |
| 1-amino-2,5-dichloro-4-nitrobenzene | 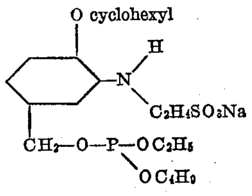 | Do. |

| Amine | Coupling component | Shade on cellulose acetate |
|---|---|---|
| 1-amino-2,4-dinitro-6-chlorobenzene | 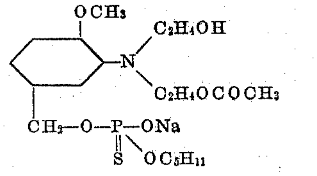 | Purple. |
| 1-amino azo benzene | 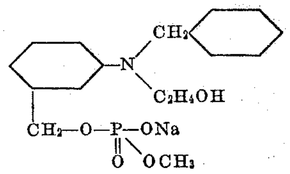 | Orange. |

Instead of coupling the various diazonium salts with the aminobenzyl sulfonates, the aminobenzyl sulfates, and the aminobenzyl acid esters of phosphorus as described above, the same diazonium salts may be coupled with aminobenzyl alcohol and its derivatives to produce azo compounds of the following general formula:

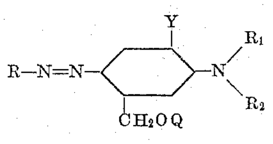

wherein $R_1$, $R_2$, and Y have the meanings previously defined, and Q represents a hydrogen, an alkyl group, an aryl group, and an acyl group.

The coupling components represented by the formula:

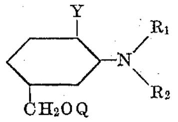

wherein $R_1$, $R_2$, Y, and Q have the meanings already defined, may be prepared by reacting benzene or substituted benzenes with carbon monoxide in the presence of a metal halide catalyst, the aromatic aldehyde thus obtained being nitrated, and the latter compound then reduced to the corresponding amino benzyl alcohol. The amino group is then alkylated and/or arylated, and the hydroxyl group is etherified or esterified as desired by the usual well known methods.

The couplers prepared as described are then coupled with the various diazonium salts by the procedures illustrated in the following examples.

*Example 9*

12.6 grams of o-chloroaniline are dissolved in 100 cc. of water containing 25 cc. of hydrochloric acid, ice is added, and the amine diazotized with 6.9 grams of sodium nitrite. 16.5 grams of 3-ethylamino-4-methyl benzyl alcohol are dissolved in cold dilute hydrochloric acid and the diazo solution is added with stirring. After standing for 15 minutes, the mixture is made neutral to Congo indicator with sodium acetate. When coupling is complete, the dye is filtered, washed and dried. Cellulose acetate is colored yellow to orange-yellow shades from aqueous solutions of the dye. The compound has the formula:

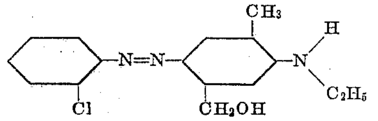

*Example 10*

17.3 grams of p-nitro-o-chloroaniline are suspended in 200 cc. of water containing 40 cc. of hydrochloric acid and diazotized at 5–15° C. with 6.9 grams of sodium nitrite. 26.7 grams of 3-ethylglycerylamino-4-ethyl-methoxymethyl benzene are dissolved in cold dilute hydrochloric acid and the diazo solution is added. After standing for 15 minutes, the mixture is made neutral to Congo indicator with sodium acetate. When coupling is complete, the dye is filtered, washed and dried. Cellulose acetate is colored orange to rubine shades from aqueous solutions of the dye. The compound has the formula:

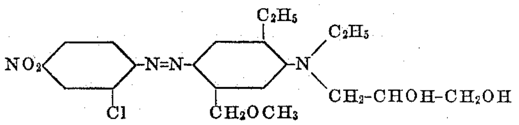

*Example 11*

The azo compound

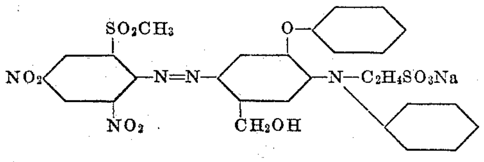

is treated with acetic acid containing an equivalent or slight excess of acetic anhydride. The mixture is warmed to complete the esterification reaction. The dye is filtered, washed and dried. Cellulose acetate is colored red to wine shades from aqueous solutions of the dye. The compound has the formula:

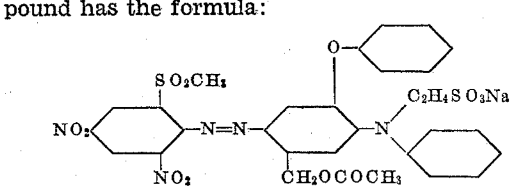

Besides the coupling components disclosed in Examples 9, 10, and 11, there may be used other 3-amino-4 alkyl or aryl substituted benzyl alcohols or their etherified or esterified derivatives such as 3-amino-4-methyl-benzyl alcohol, 3-amino-4-phenyl-benzyl alcohol, 3-amino-4-ethoxy benzyl alcohol, 3-methylamino-4-methyl benzyl alcohol, 3-β-hydroxyethylamino-4-methyl benzyl alcohol, 3-glycineamideamino-4-cyclohexylbenzyl alcohol, 3-dimethylamino-4-methoxybenzyl alcohol, 3-methylbenzylamino-4-methoxybenzyl alcohol carbonate, 3-methyltetrahydrofurfurylamino benzyl alcohol, 3-ethylallylamino-4-phenoxybenzyl alcohol, 3-ethyl-β-hydroxyethylamino-4-methylbenzyl alcohol, 3-ethyl glycerylamino-4-methoxybenzyl alcohol, 3-ethyl-β-sulfoethylamino-4-methylbenzyl alcohol, 3-butyl-β-sulfatoethylamino-4-methoxybenzyl alcohol, 3-di-β-hydroxyethylamino-4-methoxybenzyl alcohol-β-hydroxyethyl ether and similar type of coupling compounds.

Most of the azo dyes of our invention are water-soluble so that they may be used for the direct coloration of organic derivatives of cellulose, particularly cellulose acetate threads, yarns, filaments, and fabric materials, without the necessity of using a dispersing or solubilizing agent. The dyeing operations may be conducted in accordance with the usual dyeing practice, salt being added if desired to facilitate exhaustion of the dye bath. For a more detailed description as to how the water-soluble azo dyes of our invention may be employed for the coloration of cellulosic materials, reference may be had to our U. S. Patent No. 2,107,898, issued February 8, 1938. Where the particular azo compound is water-insoluble, the dye will ordinarily be applied to the material in the form of an aqueous suspension which can be prepared by grinding the dye to a paste in the presence of a sulfonated oil, soap or other suitable dispersing agent and dispersing the resulting paste in water. Dyeing operations can advantageously be conducted at a temperature of 80–85° C., but any suitable temperature may be used. Upon completion of the dyeing operation, the cellulose acetate is removed, washed with soap, rinsed and dried.

Typical organic derivatives of cellulose include the hydrolyzed as well as the unhydrolyzed cellulose organic acid esters and cellulose mixed organic acid esters such as cellulose acetate, cellulose formate, cellulose propionate, cellulose butyrate, cellulose, acetate-propionate, cellulose acetate-butyrate, and cellulose ethers such as methyl cellulose, ethyl cellulose, and benzyl cellulose.

The expression "alkyl" as used throughout the specification and claims, unless otherwise specified, is intended to mean unsubstituted alkyl such as methyl, ethyl, propyl, butyl and the like, as well as substituted alkyl such as hydroxyethyl, dihydroxypropyl, methoxyethyl, ethoxyethyl, acetoxyethyl, sulfoethyl, and sulfatoethyl groups. The expression "sulfo" group and "sulfato" group as used throughout the specification and claims are intended to mean the free acids

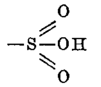

and

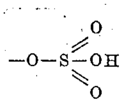

respectively, as well as their quaternary ammonium salts, and the salts formed by the substitution of the hydrogen in each case by an ammonium radical or an alkali forming metal. The expression an "acid ester of phosphorus" is intended to mean the free acids

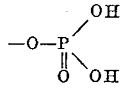

and

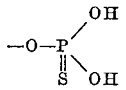

respectively, and the derivatives of these acid groups formed by substituting one or both hydrogens in each type of compound with an ammonium radical, an alkyl group, an aryl group, and an alkali forming metal.

We claim:

1. The azo compounds having the general formula:

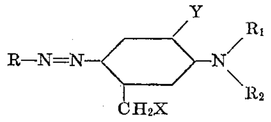

wherein R represents an aryl nucleus of the benzene series, $R_1$ and $R_2$ each represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents a member selected from the group consisting of a sulfo group, a sulfato group, and an acid ester of phosphorus group.

2. The azo compounds having the general formula:

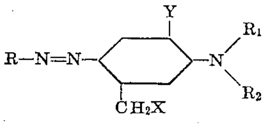

wherein R represents an aryl nucleus of the benzene series, $R_1$ and $R_2$ each represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents a sulfo group.

3. The azo compounds having the general formula:

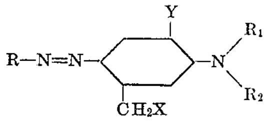

wherein R represents an aryl nucleus of the benzene series, $R_1$ and $R_2$ each represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents a sulfato group.

4. The azo compounds having the general formula:

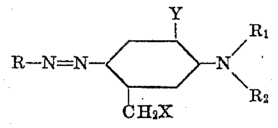

wherein R represents an aryl nucleus of the benzene series, $R_1$ and $R_2$ each represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents an acid ester of phosphorus group.

5. The azo compounds having the general formula:

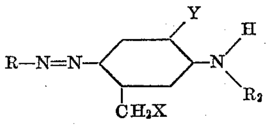

wherein R represents an aryl nucleus of the benzene series, $R_2$ represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents an acid ester of phosphorus group.

6. The azo compounds having the general formula:

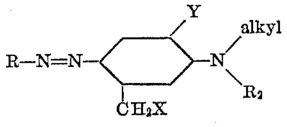

wherein R represents an aryl nucleus of the benzene series, $R_2$ represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents an acid ester of phosphorus group.

7. Material made of or containing an organic derivative of cellulose colored with a dye selected from the class of azo compounds having the general formula:

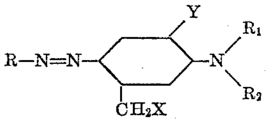

wherein R represents an aryl nucleus of the benzene series $R_1$ and $R_2$ each represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents a member selected from the group consisting of a sulfo group, a sulfato group, and an acid ester of phosphorus group.

8. Material made of or containing cellulose acetate colored with a dye selected from the class of azo compounds having the general fomula:

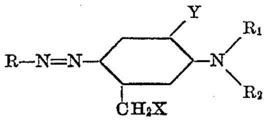

wherein R represents an aryl nucleus of the benzene series, $R_1$ and $R_2$ each represents a member selected from the group consisting of hydrogen, an alkyl group, a cycloalkyl group, an allyl group, a furfuryl group, an aralkyl group of the benzene series, and an aryl group of the benzene series, Y represents a member selected from the group consisting of hydrogen, an alkyl group, an alkoxy group, and a phenoxy group, and X represents a member selected from the group consisting of a sulfo group, a sulfato group, and an acid ester of phosphorus group.

JAMES G. McNALLY.
JOSEPH B. DICKEY.